US007584420B2

(12) United States Patent
Gaug et al.

(10) Patent No.: US 7,584,420 B2
(45) Date of Patent: Sep. 1, 2009

(54) GRAPHICAL AUTHORING AND EDITING OF MARK-UP LANGUAGE SEQUENCES

(75) Inventors: Mark Gaug, Vestal, NY (US); Richard D. Berbaum, Maine, NY (US); Edward R. Bestle, Owego, NY (US); Michael N. Blackwell, Binghamton, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 782 days.

(21) Appl. No.: 10/957,608

(22) Filed: Oct. 5, 2004

(65) Prior Publication Data

US 2005/0183007 A1    Aug. 18, 2005

Related U.S. Application Data

(60) Provisional application No. 60/543,618, filed on Feb. 12, 2004.

(51) Int. Cl.
*G06F 17/00* (2006.01)

(52) U.S. Cl. .................................. 715/234; 715/273

(58) Field of Classification Search ................ 715/513, 715/514, 516, 526, 200, 234, 273
See application file for complete search history.

(56) References Cited

U.S. PATENT DOCUMENTS

| | | | | |
|---|---|---|---|---|
| 4,371,952 A | 2/1983 | Schuck | ........................ | 364/900 |
| 4,412,281 A | 10/1983 | Works | ........................ | 364/200 |
| 4,570,261 A | 2/1986 | Maher | ........................ | 371/16 |
| 4,634,110 A | 1/1987 | Julich et al. | | |
| 5,157,667 A | 10/1992 | Carusone, Jr. et al. | ...... | 371/29.1 |
| 5,223,788 A | 6/1993 | Andreano et al. | ........... | 324/158 |
| 5,293,323 A | 3/1994 | Doskocil et al. | ....... | 364/551.01 |
| 5,408,218 A | 4/1995 | Svedberg et al. | ............ | 340/507 |
| 5,455,921 A | 10/1995 | DeFilipps et al. | ........... | 395/494 |
| 5,600,791 A | 2/1997 | Carlson et al. | ......... | 395/184.01 |
| 5,649,094 A | 7/1997 | Hayashi et al. | ........ | 395/183.06 |
| 5,712,972 A | 1/1998 | Kakkar | .................. | 395/183.02 |
| 5,748,883 A | 5/1998 | Carlson et al. | ......... | 395/184.01 |

(Continued)

FOREIGN PATENT DOCUMENTS

JP    2003002298 A    1/2003

OTHER PUBLICATIONS bDynamics, Long Wave Incorporated, www.longwaveinc.com/products-bydynamics.htm (5 pages).

(Continued)

*Primary Examiner*—Stephen Hong
*Assistant Examiner*—Gregory J Vaughn
(74) *Attorney, Agent, or Firm*—Miles & Stockbridge PC; James T Carmichael (57) ABSTRACT

A graphical mark-up language authoring system using drag and drop placement of symbols representing mark-up language elements on a computer screen drawing and connecting the blocks by lines representing data and control flow to create a mark-up language sequence design. The symbols are instances of a mark-up language element that include the properties and attributes of that element. The system also includes a mark-up language view of the elements and their attributes and properties. The system permits effective authoring of mark-up language sequences by users not expert in mark-up language sequence design.

21 Claims, 7 Drawing Sheets

U.S. PATENT DOCUMENTS

| | | | |
|---|---|---|---|
| 5,931,877 A | 8/1999 | Smith et al. | |
| 5,937,366 A | 8/1999 | Zbytniewski et al. | 702/108 |
| 6,003,808 A | 12/1999 | Nguyen et al. | |
| 6,122,575 A | 9/2000 | Schmidt et al. | |
| 6,125,312 A | 9/2000 | Nguyen et al. | |
| 6,219,626 B1 | 4/2001 | Steinmetz et al. | 702/183 |
| 6,226,675 B1 | 5/2001 | Meltzer et al. | |
| 6,240,407 B1 | 5/2001 | Chang et al. | |
| 6,240,526 B1 | 5/2001 | Petivan et al. | 714/11 |
| 6,317,659 B1 | 11/2001 | Lindsley et al. | |
| 6,421,656 B1 | 7/2002 | Cheng et al. | |
| 6,476,828 B1 | 11/2002 | Burkett et al. | |
| 6,480,974 B1 | 11/2002 | Porterfield | 714/43 |
| 6,487,479 B1 | 11/2002 | Nelson | |
| 6,510,434 B1 | 1/2003 | Anderson et al. | |
| 6,529,620 B2 | 3/2003 | Thompson | |
| 6,539,337 B1 | 3/2003 | Provan et al. | 702/183 |
| 6,556,986 B2 | 4/2003 | Hara et al. | |
| 6,567,079 B1 | 5/2003 | Smailagic et al. | |
| 6,572,376 B1 | 6/2003 | Saunders | |
| 6,574,537 B2 | 6/2003 | Kipersztok et al. | |
| 6,625,618 B1 | 9/2003 | Arai | |
| 6,654,905 B1 | 11/2003 | Dickens | 714/10 |
| 6,662,089 B2 | 12/2003 | Felke et al. | |
| 6,665,811 B1 | 12/2003 | de Azevedo et al. | 714/4 |
| 6,675,324 B2 | 1/2004 | Marisetty et al. | 714/30 |
| 6,697,718 B2 | 2/2004 | Le Draoullec et al. | |
| 6,701,457 B2 | 3/2004 | Reynolds et al. | 714/31 |
| 6,721,727 B2 | 4/2004 | Chau et al. | |
| 6,725,137 B2 | 4/2004 | Eagleton et al. | |
| 6,732,109 B2 | 5/2004 | Lindberg et al. | |
| 6,738,929 B2 | 5/2004 | Swoboda et al. | 714/28 |
| 6,772,369 B2 | 8/2004 | Smith et al. | 714/31 |
| 6,782,380 B1 | 8/2004 | Thede | |
| 6,804,677 B2 | 10/2004 | Shadmon et al. | |
| 6,961,897 B1 | 11/2005 | Peel, Jr. et al. | |
| 7,174,286 B2 * | 2/2007 | Martin et al. | 703/22 |
| 2002/0004804 A1 | 1/2002 | Muenzel | |
| 2002/0085020 A1 | 7/2002 | Carroll, Jr. | |
| 2002/0143803 A1 | 10/2002 | Chen et al. | |
| 2002/0147726 A1 | 10/2002 | Yehia et al. | |
| 2002/0147748 A1 | 10/2002 | Huang et al. | 707/517 |
| 2002/0165872 A1 | 11/2002 | Meltzer et al. | |
| 2002/0184111 A1 * | 12/2002 | Swanson | 705/26 |
| 2002/0196281 A1 | 12/2002 | Audleman et al. | |
| 2002/0198639 A1 | 12/2002 | Ellis et al. | |
| 2003/0004998 A1 | 1/2003 | Datta | |
| 2003/0009710 A1 | 1/2003 | Grant | |
| 2003/0018661 A1 | 1/2003 | Darugar | |
| 2003/0025732 A1 | 2/2003 | Prichard | |
| 2003/0028858 A1 * | 2/2003 | Hines | 717/125 |
| 2003/0037238 A1 | 2/2003 | Warner et al. | |
| 2003/0055945 A1 | 3/2003 | Bear et al. | |
| 2003/0074636 A1 | 4/2003 | Manepalli | |
| 2003/0083794 A1 | 5/2003 | Halm et al. | |
| 2003/0109973 A1 | 6/2003 | Hensey et al. | |
| 2003/0110192 A1 | 6/2003 | Valente et al. | |
| 2003/0120686 A1 | 6/2003 | Kim et al. | |
| 2003/0126136 A1 | 7/2003 | Omoigui | |
| 2003/0135825 A1 | 7/2003 | Gertner et al. | |
| 2003/0146937 A1 | 8/2003 | Lee | |
| 2003/0149934 A1 | 8/2003 | Worden | |
| 2003/0184585 A1 | 10/2003 | Lin et al. | |
| 2003/0187751 A1 | 10/2003 | Watson et al. | |
| 2003/0191564 A1 | 10/2003 | Haugse et al. | |
| 2003/0200533 A1 | 10/2003 | Roberts et al. | |
| 2003/0204332 A1 | 10/2003 | Beney et al. | |
| 2003/0204481 A1 | 10/2003 | Lau | |
| 2003/0204511 A1 | 10/2003 | Brundage et al. | |
| 2003/0212664 A1 | 11/2003 | Breining et al. | |
| 2003/0215128 A1 | 11/2003 | Thompson | |
| 2003/0237046 A1 | 12/2003 | Parker et al. | |
| 2004/0020994 A1 | 2/2004 | Muehl et al. | |
| 2004/0024501 A1 | 2/2004 | Muehl et al. | |
| 2004/0034456 A1 | 2/2004 | Felke et al. | |
| 2004/0039499 A1 | 2/2004 | Felke et al. | |
| 2004/0060007 A1 | 3/2004 | Gottlob et al. | |
| 2004/0078123 A1 | 4/2004 | Igloi et al. | |
| 2004/0098311 A1 | 5/2004 | Nair et al. | |
| 2004/0128617 A1 | 7/2004 | Oh | |
| 2004/0143599 A1 | 7/2004 | Shalabi et al. | |
| 2004/0153448 A1 | 8/2004 | Cheng et al. | |
| 2004/0172597 A1 | 9/2004 | Canali et al. | |
| 2004/0177321 A1 | 9/2004 | Brown et al. | |
| 2004/0183831 A1 | 9/2004 | Ritchey et al. | |
| 2004/0205082 A1 | 10/2004 | Fontoura et al. | |
| 2004/0205571 A1 | 10/2004 | Adler et al. | |
| 2004/0205609 A1 | 10/2004 | Milton et al. | |
| 2004/0216003 A1 | 10/2004 | Floyd et al. | 714/25 |
| 2004/0221260 A1 * | 11/2004 | Martin et al. | 717/104 |
| 2004/0268306 A1 | 12/2004 | Cheng et al. | |
| 2005/0004892 A1 | 1/2005 | Brundage et al. | |
| 2005/0021548 A1 | 1/2005 | Bohannon et al. | |
| 2005/0027480 A1 | 2/2005 | Qiao et al. | |
| 2005/0055336 A1 | 3/2005 | Hui et al. | |
| 2005/0060317 A1 | 3/2005 | Lott et al. | |
| 2005/0138544 A1 * | 6/2005 | Beck et al. | 715/513 |
| 2005/0182650 A1 | 8/2005 | Maddox et al. | |
| 2005/0183007 A1 | 8/2005 | Berbaum | |
| 2005/0223288 A1 | 10/2005 | Berbaum | |
| 2005/0223290 A1 | 10/2005 | Berbaum | |
| 2005/0240289 A1 * | 10/2005 | Hoyte et al. | 700/49 |
| 2005/0240555 A1 | 10/2005 | Wilde et al. | |
| 2006/0085692 A1 | 4/2006 | Berbaum | |
| 2006/0120181 A1 | 6/2006 | Berbaum | |
| 2006/0218512 A1 * | 9/2006 | Arslan et al. | 716/4 |

OTHER PUBLICATIONS

IETM Generation from FrameMaker or Word, Live Linx, www.livelinx.com/content/products-ietm.html (2 pages).

On board real time Fault Detection Isolation and Reconfiguration, Qualtech Systems, www.teams-rds.com/fdir/fdir_home.htm (3 pages).

Interactive Electronic Technical Manual (IETM), Direct Reporting Program Manager Advanced Amphibious, www.efv.usmc.mil/logistics/IETM.html (2 pages).

Boeing Quill 21, www.boeing.com/defense-space/aerospace/techdata/quill.htm (2 pages).

The recognized technology lead advanced integrated diagnostics and intelligent support system, Qualtech Systems, www.teams-rds.com/diagnostics_home.html (4 pages).

U.S. Appl. No. 11/019,295, Office Action dated Sep. 17, 2007.

Interactive electronic technical manual said to be world first, Dataweek, Electronics & Communication Technology, Oct. 8, 2003, dataweek.co.za/news.asp?pklNnewsID=12301&pklIssueID=357&pklCategoryID=31 (11 pages).

Simplify, Link, and Integrate Your Technical Data, Continental Datagraphics, www.cdgnow.com (4 pages).

Affidavit of Richard Berbaum (21 pages).

U.S. Appl. No. 11/019,295, Office Action dated Apr. 4, 2007.

U.S. Appl. No. 11/241,937, Office Action dated May 23, 2007.

U.S. Appl. No. 11/562,336, Matthew R. Liberty, Nov. 21, 2006.

U.S. Appl. No. 11/466,478, Matthew R. Liberty, Aug. 23, 2006.

* cited by examiner

```xml
<subtask id="LIB.TRUEFALSE"><title>True or False Question</title>
    <if-step><title>Command Exists</title>
        <expression> .EXISTS. AvMSG_TRUEFALSE </expression>
        <step-seq><title>It Does</title>
            <step><title></title>
                <dialog>
                    <menu select="SINGLE">
                        <prompt>
                            <text>
                                <variable type="STRING">AvMSG_TRUEFALSE</variable></text>
                        </prompt>
                        <choice default="NO">
                            <dialog-text>TRUE</dialog-text>
                            <assertion>
                                <variable type="BOOLEAN">AvRESP_TRUEFALSE</variable>
                                <expression> TRUE </expression>
                            </assertion>
                        </choice>
                        <choice default="NO">
                            <dialog-text>FALSE</dialog-text>
                            <assertion>
                                <variable type="BOOLEAN">AvRESP_TRUEFALSE</variable>
                                <expression> FALSE </expression>
                            </assertion>
                        </choice>
                    </menu>
                </dialog>
            </step>
        </step-seq>
        <step-seq><title>It Does not exist</title>
            <rationale>
                <para>ELSE, AvMSG string does not exits. Should NEVER get
                    here.</para>
            </rationale>
            <step><title>Logic Error Fault Group</title>
                <para>IETM Logic error. Variable AvMSG does not exist. AOP Command
                    not sent..</para>
                <fault-group>
                    <rationale>
                        <para>If we get here we have an IETM error. The AvMSG variable
                            has not been set and it should have the name of the command in it.</para>
                    </rationale>
                    <fault-title>No AvMSG variable</fault-title>
                    <fault probability="100" xrefid="MINI.xml#MINI.IETM.ERROR">
                        <title></title>
                    </fault>
                </fault-group>
            </step>
            <breakpoint>TRUE FALSE QUESTION</breakpoint>
        </step-seq>
    </if-step>
</subtask>
```

GRAPHICAL AUTHORING AND EDITING OF MARK-UP LANGUAGE SEQUENCES

This application claims the benefit of U.S. Provisional Application No. 60/543,618, filed Feb. 12, 2004, which is incorporated herein by reference.

The present invention relates to mark-up languages, and, more particularly, to graphically authoring and editing mark-up language sequences.

The increased use of digital computers in information processing has brought about an increase in the development of languages and tools to facilitate the processing of information. One such development is the mark-up language. "Mark-up" refers to a sequence of characters or other symbols that are inserted at particular places in an electronic document or file to indicate how the file should look when it is printed or displayed, or to describe the document's logical structure. A mark-up language element is often referred to as a "tag". Tags typically delimit a unit of information in a mark-up language sequence. A mark-up language describes the content of a document and, in addition, may also describe the layout for screen or page, the relationship of the data in the documents, the type of data in various parts of the documents, and/or some programmatic functionality embedded within the document. Mark-up languages include Hypertext Mark-up Language (HTML), Extensible Mark-up Language (XML), and others developed for particular applications. A mark-up language sequence is sometimes referred to as a script and, as used herein, the phrase document, sequence and script shall be used interchangeably.

XML is similar to HTML, which is often used to define web pages. Like HTML, XML is a subset of Standard Generalized Markup Language (SGML), a standard for how to create a document structure. SGML languages contain mark-up symbols to describe the contents of a page or file.

XML is, by its nature, very flexible. It is this flexibility that makes it difficult to write and edit with a standard text editor. While there are products that provide an adequate editing environment, it has been difficult for engineers not trained in the details of XML to concisely depict a process flow (consisting of steps, logic structures, looping structures, user interactivity structures, decision logic and/or starting and end points) and generate validated XML in accordance with a particular Document Type Definition (DTD). The purpose of a DTD is to define the legal building blocks of an XML document. It defines the document structure with a list of legal elements.

While mark-up languages improve the usefulness and increase the information stored within a document, they are often difficult for a person to parse. Mark-up language scripts may often contain a series of structural elements, tags, tag sequences and programmatic steps, such as, for example, conditional statements, loops, and/or declaration statements. An element of a mark-up language is typically contained within tags. Although a script will normally have a starting point and an ending point, there may be numerous paths that can be traversed according to the various conditional and loops that may be present in the script. The presence of conditionals and loops further exacerbates the problem of a person parsing the document and understanding it.

A further complexity of XML documents is that they may contain a DTD and a schema, and have their own syntax according to the language. The DTD is an optional part of the document prolog, as specified by the XML standard. The DTD specifies constraints on the valid tags and tag sequences that can be in the document. The DTD includes both the local subset, defined in the current file, and the external subset, which consists of the definitions contained in external files that are referenced in the local subset using a parameter entity. A schema is a database-inspired method for specifying constraints on XML documents using an XML-based language. Schemas address deficiencies in DTDs, such as the inability to put constraints on the kinds of data that can occur in a particular field (for example, all numeric). Since schemas are founded on XML, they are hierarchical, so it is easier to create an unambiguous specification, and possible to determine the scope over which a comment is meant to apply. While the DTD and schema are very useful within XML, they present serious difficulties for a person in parsing the document.

Mark-up languages can be employed in various information processing tasks. For example, mark-up languages can be applied to the task of programming interactive diagnostics for an Interactive Technical Manual (IETM) system. The IETM uses a mark-up language derived from XML to describe actual test sequences in the form of programs called Test Program Sets (TPS). The IETM uses the XML scripts to query a unit under test (UUT), such as, for example, a helicopter. Because of the complexities of the TPS, diagnostic engineers must understand the testing domain, be versed in writing TPS and be well versed in writing structured XML. This presents a significant challenge to the diagnostic engineers. Attempts have been made to train such engineers in all the skills necessary, but these attempts have often resulted in failure. The most common reason cited for the failure of the training is the lack of understanding the structured data authoring as applied to the diagnostic fault flow building process.

The present invention provides a solution to the difficulty of learning structured mark-up language authoring by providing a graphical authoring and editing system. The system of the present invention allows a user to author and/or edit XML scripts without having to have intimate knowledge of the various topics needed to author XML in its native form, such as, for example, the schema and the actual XML syntax.

The present invention provides a drag and drop flowchart interface to edit and modify the structure of diagnostic fault flows written in XML. The resulting graphical representation of the "programming structures" of the mark-up language makes the diagnostic fault flow much easier to understand by engineers of varying skill levels. The details of the syntax of XML are automatically generated and are abstracted away from the diagnostic engineer. This feature allows the diagnostic engineer to focus on the original design of the fault flow logic, and then insert the details where necessary. It also allows novice diagnostic engineers to understand, generate, and maintain the diagnostic fault flows, and generate the XML structured data.

Element tags can represent instructions similar to evaluating and modifying data within a computer program. For instance, a tag can represent an "if" condition, a "for loop" or any number of programming elements. The systems and methods of the present invention allow a user to graphically author and edit an XML document to perform program instructions. Further, the systems and methods of the present invention ensure that the created data is both well formed (i.e. the XML is properly structured), and valid (i.e. follows the intended structure of the DTD).

BRIEF DESCRIPTION OF THE DRAWINGS

Exemplary embodiments in accordance with the present invention will now be described with reference to the accompanying drawings, in which:

FIG. 3 is an exemplary XML mark-up language sequence;

DETAILED DESCRIPTION

The systems and methods of the present invention provide a graphical authoring and editing tool for mark-up languages. The graphical editing and authoring tool comprises the following modules: a drag and drop graphical flowchart view of the code from a template of shapes corresponding to major elements of the mark-up language (as determined by the schema describing the proper mark-up language elements and properties), a mark-up language view of the document, a view that permits the user to view and/or choose from the acceptable values for an individual mark-up language element attribute or property for each element shown in the flowchart view and synchronization of all views into a single unified tool.

XML is used for the sake of clarity in the descriptions of the exemplary embodiments of the methods and systems of the present invention. However, it should be appreciated that XML is used for illustrative purposes only and the system and methods of the present invention may be used with other mark-up languages.

Exemplary embodiments of the present invention are shown demonstrated in Microsoft™ Visio™. Visio™ is often used as a development platform for graphical flowcharting applications, such as, for example, Unified Modeling Language (UML) and the like. Visio™ is shown here for illustrative purposes only. It should be appreciated that other graphical systems, including custom designed graphical systems, can be used with the present invention.

The descriptions of the exemplary embodiments are directed to a particular application of mark-up languages, the IETM, for purposes of illustration. However, it should be appreciated that the systems and methods of the present invention may be used with other mark-up languages in other applications.

XML is a World Wide Web Consortium (W3C) standard that allows the user to create his own mark-up language tags. XML is "extensible" because the markup symbols are unlimited and self-defining.

An author can insert markup tags directly into a document by typing symbols in. More sophisticated editors that allow a user to create a document as the user wants it to appear are also available, such as, for example, a "what you see is what you get", or WYSIWYG, editor.

XML describes a class of data objects called XML documents and partially describes the behavior of computer programs which process them. XML markup encodes a description of the document's storage layout and logical structure. XML provides a mechanism to impose constraints on the storage layout and logical structure.

An XML document primarily consists of a strictly nested hierarchy of elements with a single root. Elements can contain character data, child elements, or a mixture of both. In addition, they can have attributes. Child character data and child elements are strictly ordered.

A Document Type Definition (DTD) is a specific definition that follows the rules of SGML. A DTD is a specification that accompanies a document and defines the markups. XML uses a DTD and/or an XML schema to describe the data. An XML document along with an accompanying DTD and/or schema is designed to be self-descriptive.

The systems and methods of the present invention provide a mark-up language authoring tool that comprises a drag-and-drop flowchart interface to create and modify the structure of diagnostic fault flows. The native format of the diagnostic fault flows is XML. The resulting graphical representation of the "programming structures" of the XML makes the diagnostic fault flow much easier to understand by all levels of engineers. Details of the XML syntax are automatically generated and invisible to the diagnostic engineer.

Element tags in this tool can represent instructions similar to evaluating and modifying data within a computer program. For example, a tag can represent an "if" condition or a "for" loop. The generated XML is able to include the diagnostic decision-making process or "diagnostic flow." The user can graphically author XML documents to perform programming instructions by placing symbols chosen from a user-selectable palette into a flowchart. The tool also ensures that the generated XML is properly structured and valid.

The graphical authoring tool allows a user to understand and edit XML structures without having to understand the full syntax of the XML language. The XML author's productivity is increased using the drag and drop capability to author XML. It gives a graphical view of the XML data. The graphical representations of the XML elements can be filtered to display and use only those elements allowed by the data type definition. This capability frees the user from being required to perform all validations after writing the actual XML data.

Figure 1:
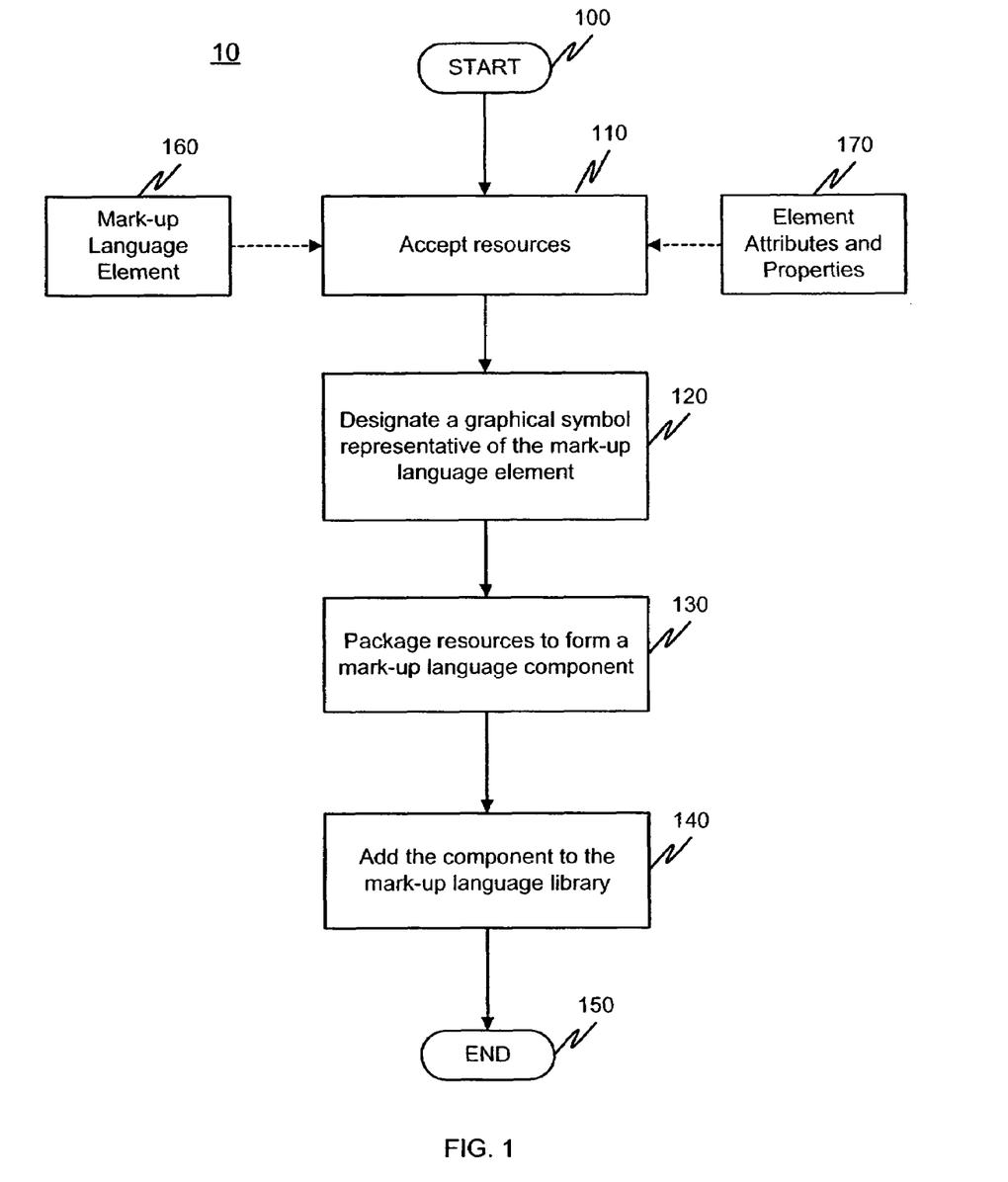
FIG. 1 is a flowchart showing an exemplary method of creating and adding a mark-up language component to a library.

In order to use the graphical mark-up language authoring tool, a library of XML components is created to provide the user with components from which to choose. FIG. 1 shows a flowchart of an exemplary method of creating and adding a mark-up language component to a library. In particular, the method 10 starts with step 100. Control then proceeds to step 110.

In step 10, resources are accepted. The resources accepted comprise a mark-up language element 160 containing the mark-up language code and attributes and properties 170 associated with the mark-up language element 160. Control then transfers to step 120.

In step 120, a graphical symbol is designated to represent the mark-up language component. Control then transfers to step 130.

In step 130, the resources, comprising the mark-up language code, the properties and attributes, and the graphical symbol, are packaged in a database. Control then transfers to step 140.

In step 140, the packaged resources are added to a mark-up language component library. Control then transfers to step 150, where the sequence ends.

Steps 100-150 may be repeated as necessary to add all of the components required by the contemplated use of the present invention.

Figure 2:
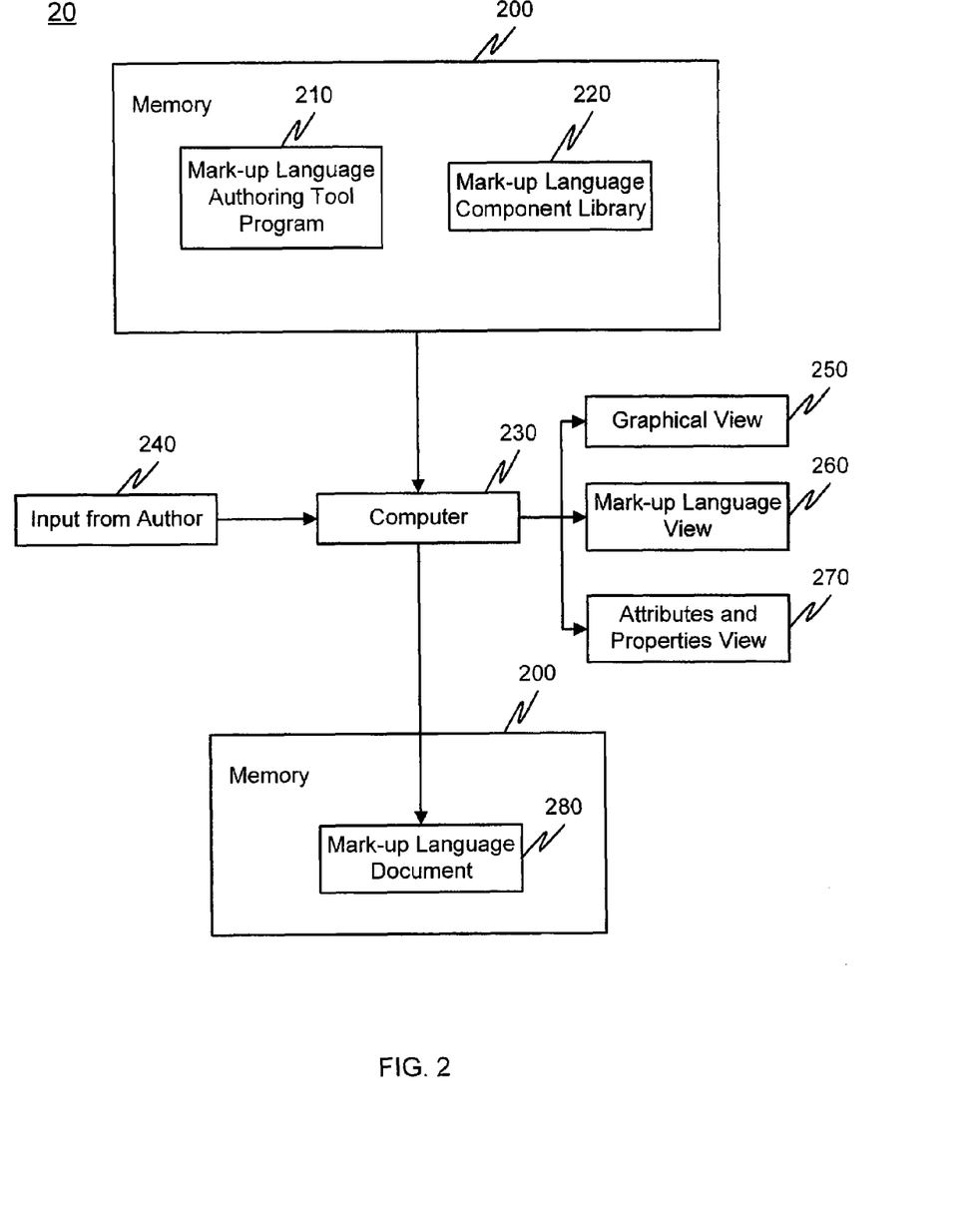
FIG. 2 is a high-level block diagram of an exemplary system for graphically authoring and editing mark-up language sequences in accordance with the present invention.

Once the library of mark-up language components has been created, the authoring tool can be used to author or edit mark-up language sequences. FIG. 2 shows an exemplary system 20 for graphically authoring and editing a mark-up language sequences in accordance with the present invention. In particular, the system comprises a computer 230, and a memory 200 containing a mark-up language authoring tool program 210, a mark-up language component library 220, and a mark-up language sequence 280. In addition, the system comprises input from the author 240, a graphical view 250 of the mark-up language sequence, a mark-up language view 260 of the mark-up language sequence, and an attributes and properties view 270 of the mark-up language components (not shown).

In operation, the computer 230 executes the mark-up language authoring tool program 210. The mark-up language authoring tool program 210 loads the mark-up language component library 220 into memory 200. The mark-up language authoring tool program 210, either automatically, or under user control, loads the mark-up language sequence 280 into memory 200.

The computer 230 through executing the mark-up language authoring tool program 210 presents a graphical view 250 of the mark-up language sequence 280, a mark-up language view 260 of the mark-up language sequence 280, and/or an attributes and properties view 270 of the mark-up language sequence 280. The computer 230 receives input from the author 240. The input from the author 240 is used to author and/or edit the mark-up language sequence 280. The input from the author may typically be received through an input device capable of indicating a cursor coordinate position on a graphical interface, such as, for example, a computer mouse, trackball, graphics tablet, light pen, keyboard, or the like. The mark-up language sequence is authored and/or edited by graphically selecting mark-up language components (not shown) from a user-selectable list created from the mark-up language component library 220 and placing the component in the mark-up language sequence 280 in a "drag-and-drop" fashion. "Drag-and-drop" refers to a method of using an input device to select a displayed graphical symbol and then using the input device to indicate a desired location for the item represented by the graphical symbol to be placed.

FIG. 3 shows an exemplary XML file of a simple control sequence. This XML sample is used to show the complexity of the XML language in comparison with the complexity of the task being performed. Even for a relatively simple task, the XML document can be difficult to understand by the non-expert. In particular, the XML listing in FIG. 3 represents a true/false test sequence. First, the XML sequence determines if a variable has been set. If the variable has been set, then a command name will be stored in the variable. Then, the sequence prompts for a positive or negative response. Based on this response, the sequence sets the value of a response variable to a logical value of true or false.

If the variable has not been set, then an error condition is detected and a message is generated to the operator and a variable is set to a value indicating a variable fault.

Figure 4:
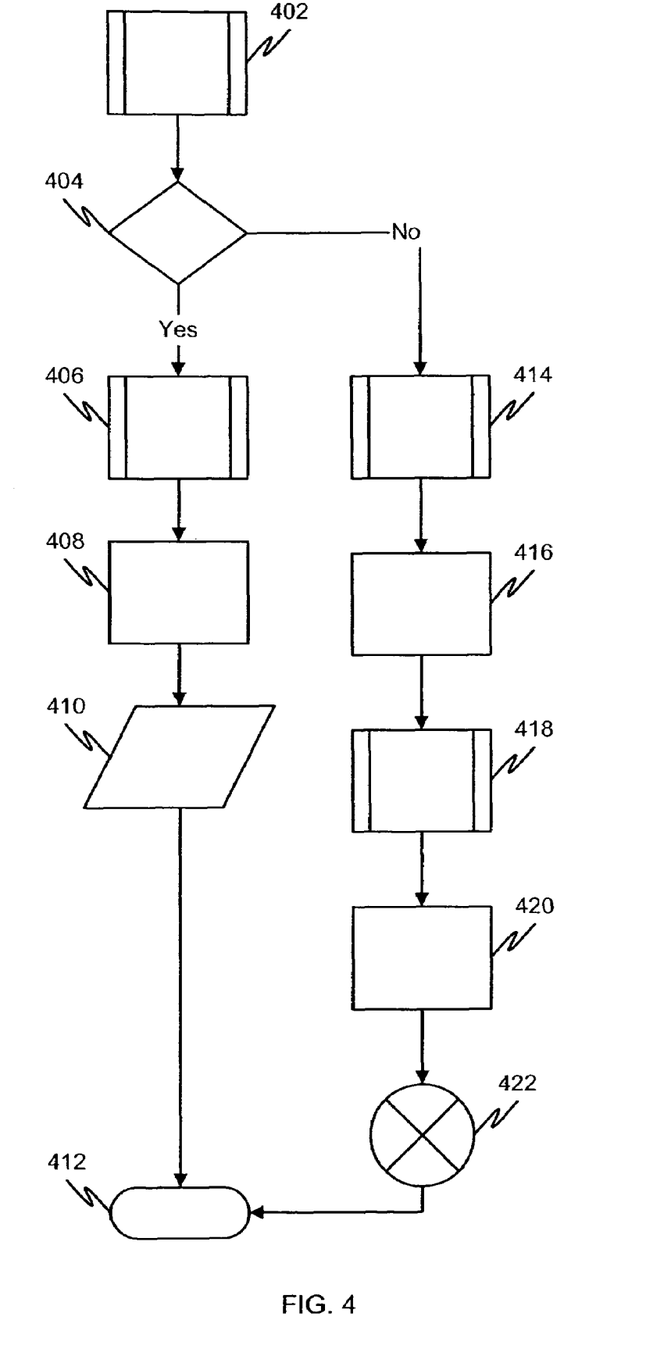
FIG. 4 is a graphical flowchart representation of the XML sequence shown in FIG. 3.

FIG. 4 shows a flowchart view of the exemplary XML document shown in FIG. 3. The flowchart view shown in FIG. 4 permits a wider range of people with varying technical expertise in XML to understand the sequence contained in the document. In particular, the flowchart begins with a subtask label element 402. As can be seen in the XML shown in FIG. 3, the subtask identification label is "LIB.TRUEFALSE." Next, control transfers to a decision element 404.

The decision element 404 evaluates an expression that determines whether a variable has been set. The variable stores a command if it has been set. If the variable is set, control transfers to a step sequence element 406. If the variable is not set, control transfers to a different step sequence element 414. From the flowchart it can be readily observed that the subtask contains two primary branches of XML code.

The step sequence element 406 contains the label of the step sequence, "It Does", which represents the step sequence executed when the command does exist. Control then transfers to a step element 408.

The step element 408 contains the functionality for the next step in the step sequence. Within the step element 408 control transfers to a dialog element 410.

The dialog element 410 queries a user for input. Once the user input is received, the dialog element 410 sets a response variable based on the response to the dialog element 410. If the response was positive then the response variable is set to a logical value of TRUE. If the response received was negative then the response variable is set to a logical value of FALSE. Control then transfers to a terminal element 412, where the sequence ends and control returns to the task (not shown) that initiated the subtask 402.

If the result of the decision element 404 was that the variable did not contain a command, then control transfers to the step sequence element 414. Step sequence element 414 contains the label of the step sequence, "It does not exist." Control then transfers to a step sequence element 416.

The step sequence element 416 contains the step title of "Logical Error Fault Group." The step sequence element 416 also contains a text description summarizing the error condition for the operator. Within the step element 416, control transfers to a fault group element 418.

The fault group element 418 contains the fault title and other details related to the fault, such as, for example, probability. Once the fault group element 418 has been evaluated, control transfers to a step sequence element 420.

The step sequence 420 contains a breakpoint element 422. The break point element 422 stops execution of the mark-up language flow sequence to alert the operator to the error condition. After the breakpoint element has been executed, control then transfers to a terminal element 412, where the sequence ends and control returns to the task (not shown) that initiated the subtask 402.

Figure 5:
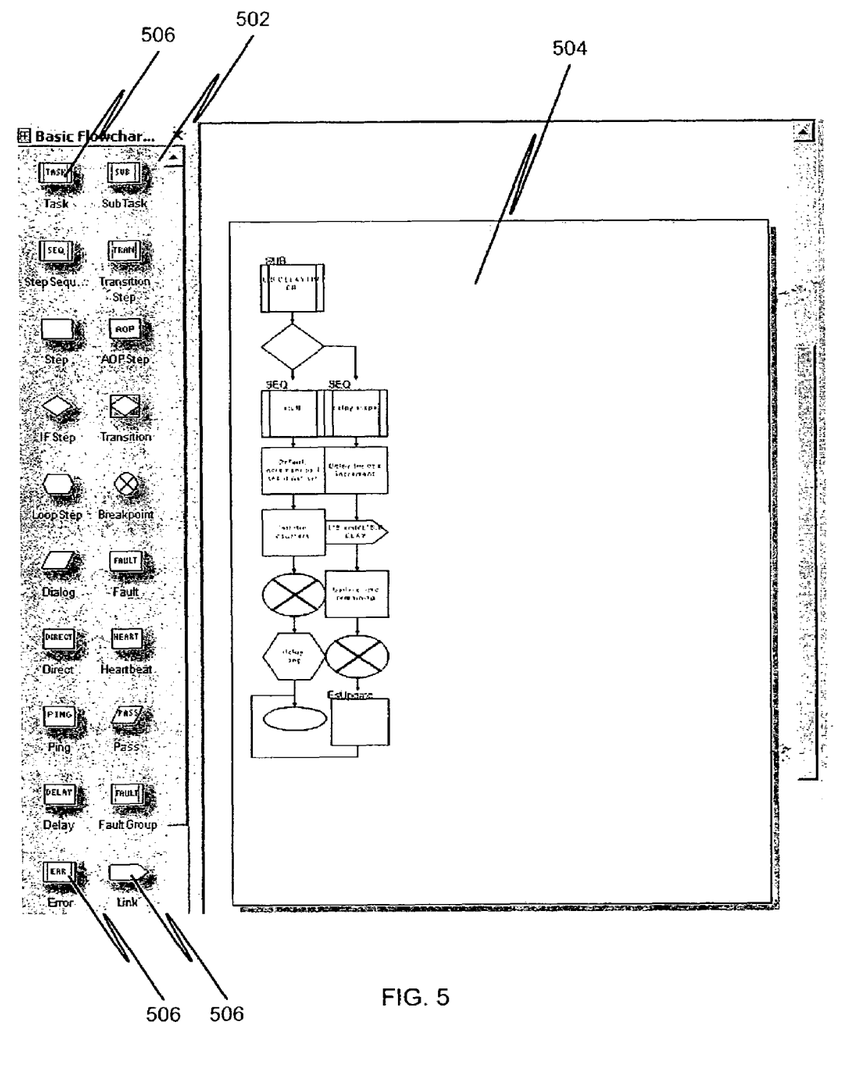
FIG. 5 is a screenshot of an exemplary tool for graphically authoring mark-up language sequences in accordance with the present invention showing an exemplary component palette and flowchart working area.

FIG. 5 is a screenshot of an exemplary tool for graphically authoring mark-up language sequences in accordance with the present invention showing an exemplary graphic interface containing sections for a mark-up language component palette and flowchart working area. In particular, there is a palette 502 of user-selectable components represented by icons 506 and an authoring and editing area 504. The sections of the graphical interface can be windows, drop down lists, menu selection items, pop-up boxes, dialog boxes or any other graphical user interface element that is capable of implementing the necessary functions for graphically authoring and editing mark-up language sequences according to the present invention.

In operation, the flowchart view can be used to insert and delete instructions. The palette 502 of user-selectable component icons 506 has representations of each of the available components. The palette 502 is constructed from the schema and configuration files so it only contains the icons that generate valid XML elements. When an icon 506 is dragged from the template and dropped on an existing flow view, the shape is then inserted automatically into the flowchart. Additionally, the XML is automatically generated and inserted into the XML document and all other views are synchronized to the flowchart. With one drag and drop operation, an XML script is generated that is well formed and, by design, is validated according to the schema. No further error checking is necessary.

Figure 6:
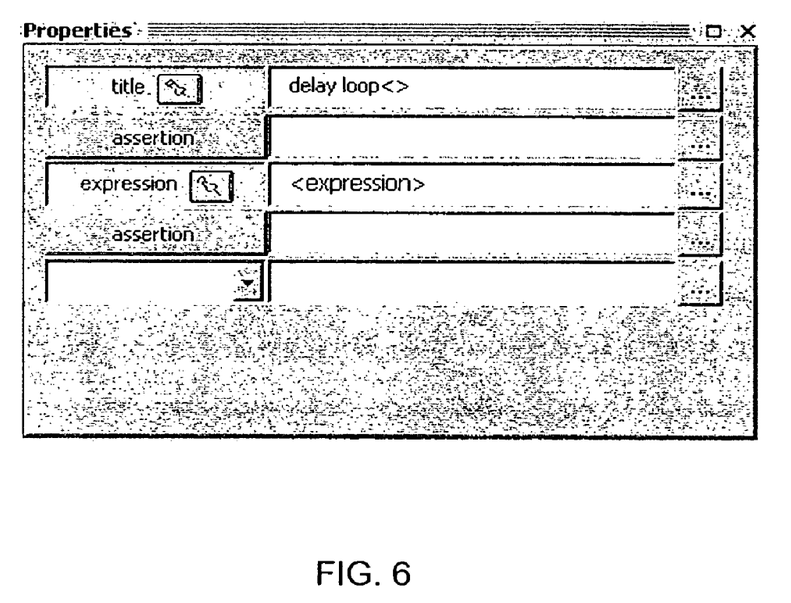
FIG. 6 is a screenshot of an exemplary XML property form in accordance with the present invention.

FIG. 6 is a screenshot of an exemplary XML property form in accordance with the present invention. In particular, the properties form contains a user interface component for entering a title of the component, an expression associated with the element, assertions associated with the various fields of the component, and additional fields for selecting and entering other properties of the component. Assertions are programming constructs designed to validate the data of a particular field or property associated with the component.

In operation, not all details associated with a particular component can be contained in a drag and drop flowchart symbol. Individual XML instructions have associated attributes and elements (referred to herein as properties). To abstract the user from the underlying XML, the interface also needs a facility for the entry of properties associated with an XML component. The XML graphical editing tool uses the XML Properties Form of FIG. 6 for this purpose. Using the XML Properties Form to input XML Properties, the user does not have to remember property names nor type them in. The user chooses from a drop down list or selects a button. The values for the selected property (the second column of FIG. 6) is either a drop down list itself, filled through a sub form, or filled using keyboard input (validated as the user types). The actual form layout is dynamically generated from the XML Schema rules (thus when the schema changes, the property forms change). While the exemplary property form shown contains specific user interface elements, it should be appreciated that the property form can be implemented with a variety of user interface elements according to the contemplated use of the present invention.

Figure 7:
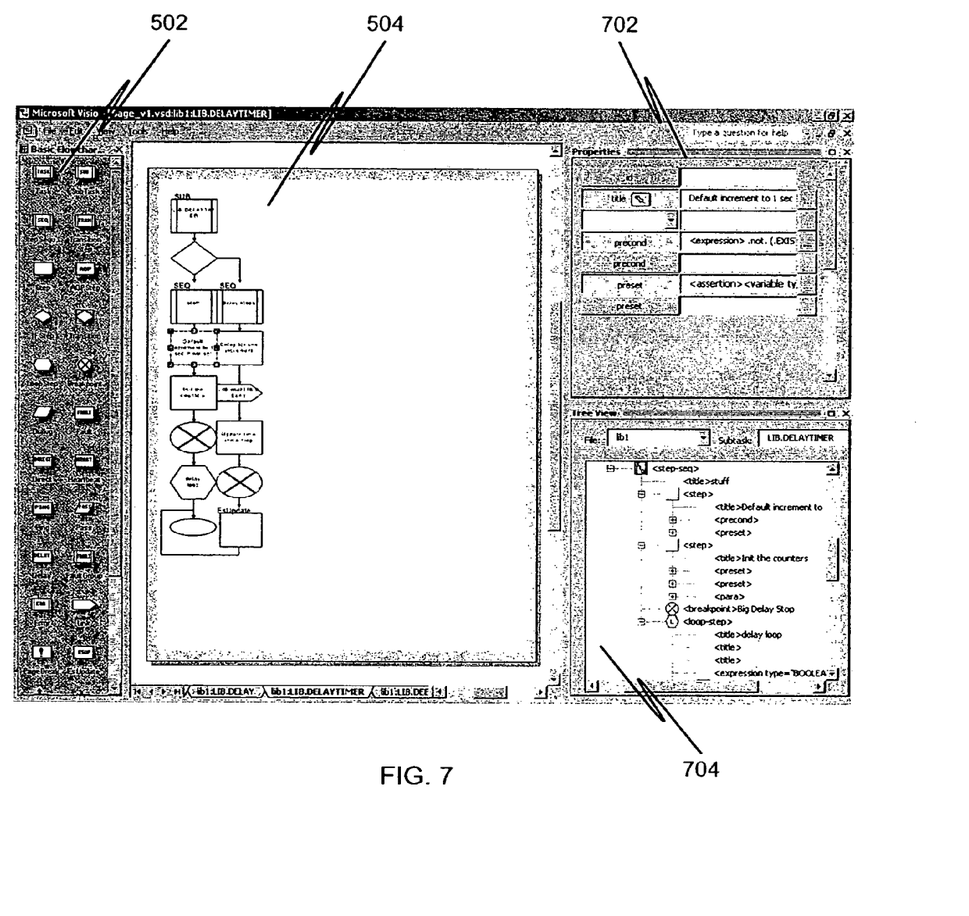
FIG. 7 is a screenshot of an exemplary tool combining the palette, flowchart, property form and XML tree views.

FIG. 7 is a screenshot of an exemplary tool combining a palette, a flowchart, a properties form and an XML tree view. In particular, the unified authoring and editing environment of FIG. 7 contains a palette 502 of user-selectable components represented by icons, an authoring and editing area 504, a properties form 702, and an XML tree view 704.

In operation, using the unified graphical XML tool described herein, the user is totally abstracted from the XML and the underlying XML schema. The user sets up the flow of the program in the flowchart views by a simple drag and drop facility. The individual properties of each instruction are then selected and entered on the Properties Forms. The user then can see the resultant XML code viewed in the XML tree view 704 window. There is much less chance for entry errors that can be time consuming, since only the valid options are available for selection or allowed to be entered. Data entry through a keyboard is reduced. There are no post-editing error messages. Errors are avoided since errors are either not possible (through the use of drag-and-drop symbols and selection lists) or entries are validated in real-time as the entries are typed. The unified graphical XML tool also provides an integrated design environment to visualize and maintain scripts. The tool keeps the user focused on solving a problem, not focused on ensuring the data is well formed or valid. The typical user (since the interface abstracts away the underlying XML code) can be less experienced and skilled in mark-up languages.

Additionally, for a more advanced user, a tree view 704 of the XML code is provided in addition to the flowchart and the property form inputs. This view permits the more advanced user to view and edit the XML code directly. All views are synchronized. A change in one view is reflected in the other views. Once the graphical editing of the mark-up language is complete, the graphical mark-up language authoring tool program may store the native mark-up language code representation of the mark-up language sequence.

As shown in the above figures, the graphical mark-up language methods and systems can be implemented on a general-purpose computer, a special-purpose computer, a programmed microprocessor or microcontroller and peripheral integrated circuit element, and ASIC or other integrated circuit, a digital signal processor, a hardwired electronic or logic circuit such as a discrete element circuit, a programmed logic device such as a PLD, PLA, FPGA, PAL, or the like. In general, any process capable of implementing the functions described herein can be used to implement a system for graphically authoring and/or editing mark-up language sequences according to this invention.

Furthermore, the disclosed system may be readily implemented in software using object or object-oriented software development environments that provide portable source code that can be used on a variety of computer platforms. Alternatively, the disclosed system for graphically authoring and editing mark-up language sequences may be implemented partially or fully in hardware using standard logic circuits or a VLSI design. Other hardware or software can be used to implement the systems in accordance with this invention depending on the speed and/or efficiency requirements of the systems, the particular function, and/or a particular software or hardware system, microprocessor, or microcomputer system being utilized. The graphical mark-up language authoring and editing system illustrated herein can readily be implemented in hardware and/or software using any known or later developed systems or structures, devices and/or software by those of ordinary skill in the applicable art from the functional description provided herein and with a general basic knowledge of the computer and mark-up language arts.

Moreover, the disclosed methods may be readily implemented in software executed on programmed general-purpose computer, a special purpose computer, a microprocessor, or the like. In these instances, the systems and methods of this invention can be implemented as program embedded on personal computer such as JAVA® or CGI script, as a resource residing on a server or graphics workstation, as a routine embedded in a dedicated encoding/decoding system, or the like. The system can also be implemented by physically incorporating the system and method into a software and/or hardware system, such as the hardware and software systems of an image processor.

It is, therefore, apparent that there is provided in accordance with the present invention, systems and methods for graphically authoring and editing mark-up language sequences. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this invention.

What is claimed is:

1. A computer program product for enabling a computer to provide graphical authoring and editing of a diagnostic fault flow mark-up language sequence, wherein the diagnostic fault flow mark-up language sequence comprises at least a portion of an interactive electronic technical manual test program sequence for testing at least a portion of at least one system of an aircraft, comprising:

software instructions for enabling the computer to perform predetermined operations; and a computer readable medium bearing the software instructions;

the predetermined operations including the steps of:

displaying a plurality of user-selectable graphical symbols, wherein each graphical symbol is representative of a mark-up language component that includes a unit of functionality in a diagnostic fault flow, wherein each mark-up language component comprises an attribute module and mark-up language code;

selecting a first mark-up language component in response to user input;

displaying a first graphical representation of the first selected mark-up language component;

selecting a second mark-up language component in response to user input;

displaying a second graphical representation of the second selected mark-up language component;

connecting the first graphical representation to the second graphical representation by one or more lines on a graphical interface in response to user input;

configuring the code of the first mark-up language component for use in the mark-up language sequence by initializing the attributes and properties of the first mark-up language component responsive to the presence of the second mark-up language component;

configuring the code of the second mark-up language component for use in the mark-up language sequence by initializing the attributes and properties of the second mark-up language component responsive to the presence of the first component;

displaying the attributes and properties of the first selected mark-up language component on a graphic interface in response to user input;

editing the attributes and properties of the first selected mark-up language component in response to user input;

displaying the attributes and properties of the second selected mark-up language component on a graphic interface in response to user input;

editing the attributes and properties of the second selected mark-up language component in response to user input;

displaying mark-up language code associated with each selected mark-up language component on a graphic interface in response to user input, wherein the mark-up language code comprises at least a portion of an interactive electronic technical manual test program sequence for testing at least a portion of a system of an aircraft; and outputting the diagnostic fault flow mark-up language sequence to an interactive electronic technical manual such that the diagnostic fault flow mark-up language sequence can be executed on the interactive electronic technical manual to assist with a diagnostic evaluation of the aircraft, wherein the computer provides graphical authoring and editing capability of at least a portion of an interactive electronic technical manual test program sequence for testing at least a portion of at least one system of the aircraft.

2. The computer program product of claim 1, wherein the aircraft is a helicopter.

3. A graphical mark-up language authoring system for authoring interactive technical manual test program sequences, comprising:

a memory containing a graphical mark-up language authoring tool program, a mark-up language component library and a mark-up language sequence constituting an executable diagnostic fault flow including an interactive electronic technical manual test program sequence; and a computer connected to the memory, the computer operable to execute the graphical mark-up language authoring tool program, wherein the graphical mark-up language authoring tool program supports the creation of mark-up language for the mark-up language sequence by permitting a user of the computer to author an interactive technical manual test program sequence by selecting a symbol representative of a mark-up language component from a mark-up language component library having a plurality of user-selectable mark-up language components.

4. The graphical mark-up language authoring system of claim 3, wherein each of the plurality of user-selected components within the mark-up language component library has an attribute module and the graphical mark-up language authoring tool is operable to create the mark-up language code responsive to one of the attribute modules.

5. The graphical mark-up language authoring system of claim 3, wherein each graphical mark-up language component comprises mark-up language code and the graphical mark-up language authoring tool program is operable to display the mark-up language code on a graphic display.

6. The graphical mark-up language authoring system of claim 3, further comprising a display for displaying one or more of the mark-up language component library, the mark-up language sequence, mark-up language component attributes and properties and mark-up language code.

7. The graphical mark-up language authoring system of claim 3, wherein the interactive electronic technical manual test program sequence comprises data and logic for diagnosing at least a portion of a system on an aircraft.

8. The graphical mark-up language authoring system of claim 7, wherein the aircraft is a helicopter.

9. A method for creating a component in a mark-up language component library having a plurality of such components for use in a graphical mark-up language authoring system, comprising:

accepting a plurality of resources for a unit of primary diagnostic fault flow functionality represented by a mark-up language component, wherein a first resource of the plurality of resources comprises a mark-up language code, and a second resource of the plurality of resources comprises an attribute module, the attribute module comprises attributes and properties of the mark-up language component;

designating a graphical symbol representative of the mark-up language component;

grouping the mark-up language code, the attribute module and the graphical symbol in a database to form the mark-up language component; and inserting the mark-up language component into a diagnostic fault flow mark-up language component library.

10. The method of claim 9, further comprising the step of providing configuration assistance through the attributes and properties of the attribute module for adapting the mark-up language code for use in a diagnostic fault flow mark-up language sequence when the component is included in the diagnostic fault flow mark-up language sequence.

11. The method of claim 10, further comprising the steps of:

displaying a plurality of user-selectable graphical symbols, wherein each graphical symbol is representative of a mark-up language component;

connecting a first graphical representation of the first graphical symbol to a second graphical representation of the second graphical symbol;

configuring code of a first mark-up language component associated with the first graphical symbol for use in the diagnostic fault flow mark-up language sequence by initializing the attributes and properties of the first component responsive to the presence of a second mark-up language component associated with the second graphical symbol; and configuring the code of the second mark-up language component for use in the diagnostic fault flow mark-up language sequence by initializing the attributes and properties of the second mark-up language component responsive to the presence of the first mark-up language component.

12. The method of claim 11, further comprising the step of positioning the first selected mark-up language component and the second selected mark-up language component on a graphic interface in response to user input.

13. The method of claim 12, wherein the step of positioning comprises:
   selecting a first mark-up language component;
   displaying a first graphical representation of the first selected mark-up language component;
   selecting a second mark-up language component;
   displaying a second graphical representation of the second selected mark-up language component; and
   connecting the first graphical representation to the second graphical representation by one or more lines on the graphic interface.

14. The method of claim 13, wherein the lines are generated on the graphic display in response to user input.

15. The method of claim 14, further comprising the step of displaying the attributes and properties of the first selected mark-up language component on a graphic interface.

16. The method of claim 15, further comprising the step of editing the attributes and properties of the first selected mark-up language component.

17. The method of claim 16, further comprising the step of displaying the attributes and properties of the second selected mark-up language component on a graphic interface.

18. The method of claim 17, further comprising the step of editing the attributes and properties of the second selected mark-up language component.

19. The method of claim 18, further comprising the step of displaying the mark-up language code associated with each selected mark-up language component on a graphic interface.

20. The method of claim 19, wherein the diagnostic fault flow mark-up language sequence comprises at least a portion of an interactive electronic technical manual test program sequence, wherein the interactive electronic technical manual test program sequence comprises data or logic for testing at least a portion of a system of an aircraft.

21. The method of claim 20, wherein the aircraft is a helicopter.

* * * * *